(12) United States Patent
Christenson

(10) Patent No.: US 6,318,704 B1
(45) Date of Patent: *Nov. 20, 2001

(54) METHOD FOR THREADING WIRE THROUGH A WALL OR PARTITION

(76) Inventor: Bryan W. Christenson, 1100 N. Meridian St., #49, Newberg, OR (US) 97132

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,083

(22) Filed: Jan. 20, 2000

Related U.S. Application Data

(60) Provisional application No. 60/117,282, filed on Jan. 26, 1999.

(51) Int. Cl.[7] .................................................. H02G 1/00
(52) U.S. Cl. ............................. 254/134.3 R; 294/19.1; 294/61
(58) Field of Search ..................... 294/1.1, 19.1, 294/61; 29/278; 254/134.3 R, 134.7, 134.3 FT, 134.3 CL; 24/115 R, 122.6

(56) References Cited

U.S. PATENT DOCUMENTS

| | | | |
|---|---|---|---|
| 24,814 | * 7/1859 | Mayer | 294/61 |
| 1,186,831 | * 6/1916 | Price | 294/61 |
| 2,367,105 | * 1/1945 | Donaldson | 294/61 |
| 2,708,853 | 5/1955 | MacLean | 408/226 |
| 3,670,416 | 6/1972 | Kroder | 408/226 |
| 3,697,188 | 10/1972 | Pope | 408/226 |
| 4,033,703 | 7/1977 | Slater | 408/211 |
| 4,225,173 | * 9/1980 | Martinez | 294/61 |
| 4,230,305 | 10/1980 | Comroe | 254/134.3 FT |
| 4,386,800 | 6/1983 | Stegall | 294/100 |
| 4,432,663 | 2/1984 | Lasak et al. | 403/275 |
| 5,149,231 | 9/1992 | Bowling | 408/82 |
| 5,273,329 | * 12/1993 | Wessel | 294/1.1 |
| 5,310,294 | 5/1994 | Perkins | 408/226 |
| 5,458,317 | 10/1995 | Caracofe et al. | 254/134.3 R |
| 5,529,443 | 6/1996 | Flener | 408/226 |
| 5,687,954 | 11/1997 | Schroeder | 254/134.3 R |
| 6,004,329 | * 12/1999 | Myers et al. | 294/19.1 |

FOREIGN PATENT DOCUMENTS

| | | | |
|---|---|---|---|
| 3341-692 | * 5/1985 | (DE) | 254/134.3 R |
| 3712-257 | * 10/1988 | (DE) | 254/134.3 R |

* cited by examiner

Primary Examiner—Dean J. Kramer
(74) Attorney, Agent, or Firm—Chernoff, Vilhauer, McClung & Stenzel, LLP

(57) ABSTRACT

A wire pulling tool for threading a wire through a wall or partition includes an elongate shank having a threaded end adapted to engage the end of a wire such as a cable or other type of electrical wire and a tapered end having a head ending in a point. The tool is especially adapted for structures having inner and outer walls. Once the wire is engaged the tool is pushed through a hole in the wall to the other side. The wire may then be pulled through the wall by pulling on the tool.

4 Claims, 3 Drawing Sheets

METHOD FOR THREADING WIRE THROUGH A WALL OR PARTITION

This application is a continuation of patent application Ser. No. 60/117,282 filed Jan. 26, 1999.

BACKGROUND OF THE INVENTION

The present invention relates to a tool for threading wire through walls.

Telephone and cable television installers must frequently thread cables through walls where holes have been drilled to accommodate electrical cables. Often the walls are double walls, that is, the cable must be threaded through a first or interior wall partition and a second or exterior wall partition. Frequently, insulation is stuffed into the space between the wall partitions. This presents a problem, especially with cables that have little tensile strength, as the cables bend and cannot be forced through the space between the wall partitions. Sometimes the holes must be drilled separately because of the insulation residing between the walls. The problem is also encountered in floors where there is sub-flooring with insulation beneath it and in ceilings where insulation has been piled in the attic on top of the ceiling.

Many complicated devices have been developed for drilling holes and installing wires or cables therethrough. Two examples of such devices are disclosed in Pope, U.S. Pat. No. 3,697,188, and Flener, U.S. Pat. No. 5,529,433. Both of these devices are relatively complicated. Further, as holes are often already bored, such as in the case of a reinstallation of a faulty wire or where a second telephone line is to be added, drilling is often unnecessary. Perkins, U.S. Pat. No. 5,310,294, discloses another device in which a cutting element bores a hole through a wall. Then, before removing the cutting element, a wire attachment apparatus is coupled to the cutting element. The wire cutting element, with the attached wire attachment apparatus and wire, is then pulled through the hole. Again, if the holes are already bored, this device is overly complicated and the cutting apparatus is unnecessary.

Other devices have been developed to catch a loose or hooked end of a cable within a narrow structure such as a wall. Caracofe et al., U.S. Pat. No. 5,458,317 and Comroe, U.S. Pat. No. 4,230,305, disclose devices that can catch, grab, or otherwise receive a pre-threaded cable. These devices are necessary when the cable is being threaded long distances through walls. These devices are particularly suited to situations where the first hole is above the second hole. However, because these devices require relatively large openings in the wall in order to insert their catching ends, they should only be used when absolutely necessary.

The device described in Stegall, U.S. Pat. No. 4,386,800, is used for pulling wire through pre-drilled holes. This device, however, includes multiple parts including cable grasping fingers. These parts, particularly the cable grasping fingers, could easily break, could easily be bent, or could easily become lost. Also, because the cable must be inserted into the sleeve, the size (outer diameter) of the cable to be pulled through the wall is strictly limited by the inner diameter of the sleeve.

What is needed then is a simple device that is capable of threading wire or cable through pre-drilled holes in a wall, ceiling, or flooring. The device should be sturdy and adaptable to multiple types and sizes of wire and cable.

DETAILED DESCRIPTION OF THE PREFERRED EMBODIMENT

Figure 1:
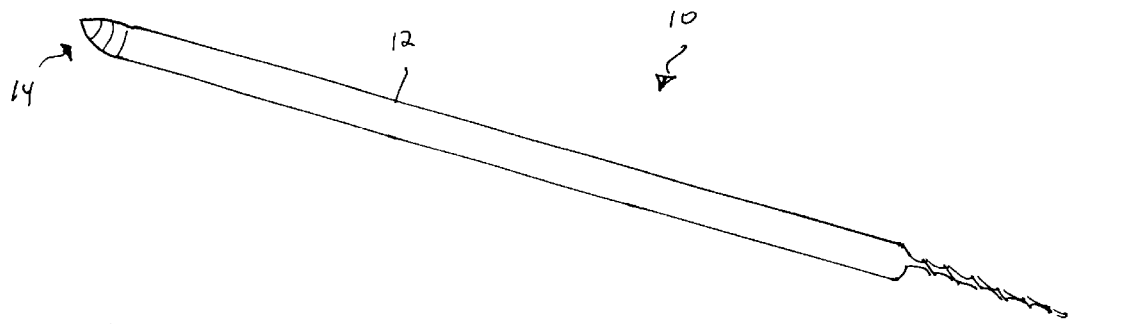
FIG. 1 is a simplified side view of a preferred embodiment of the wire threading tool of the present invention.
Figure 3:
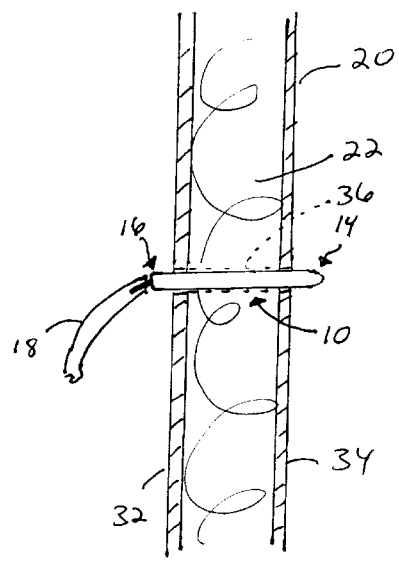
FIG. 3 is a simplified side view of a preferred embodiment of the threading tool of the present invention interconnected with a wire and being threaded through a wall.
Figure 4:
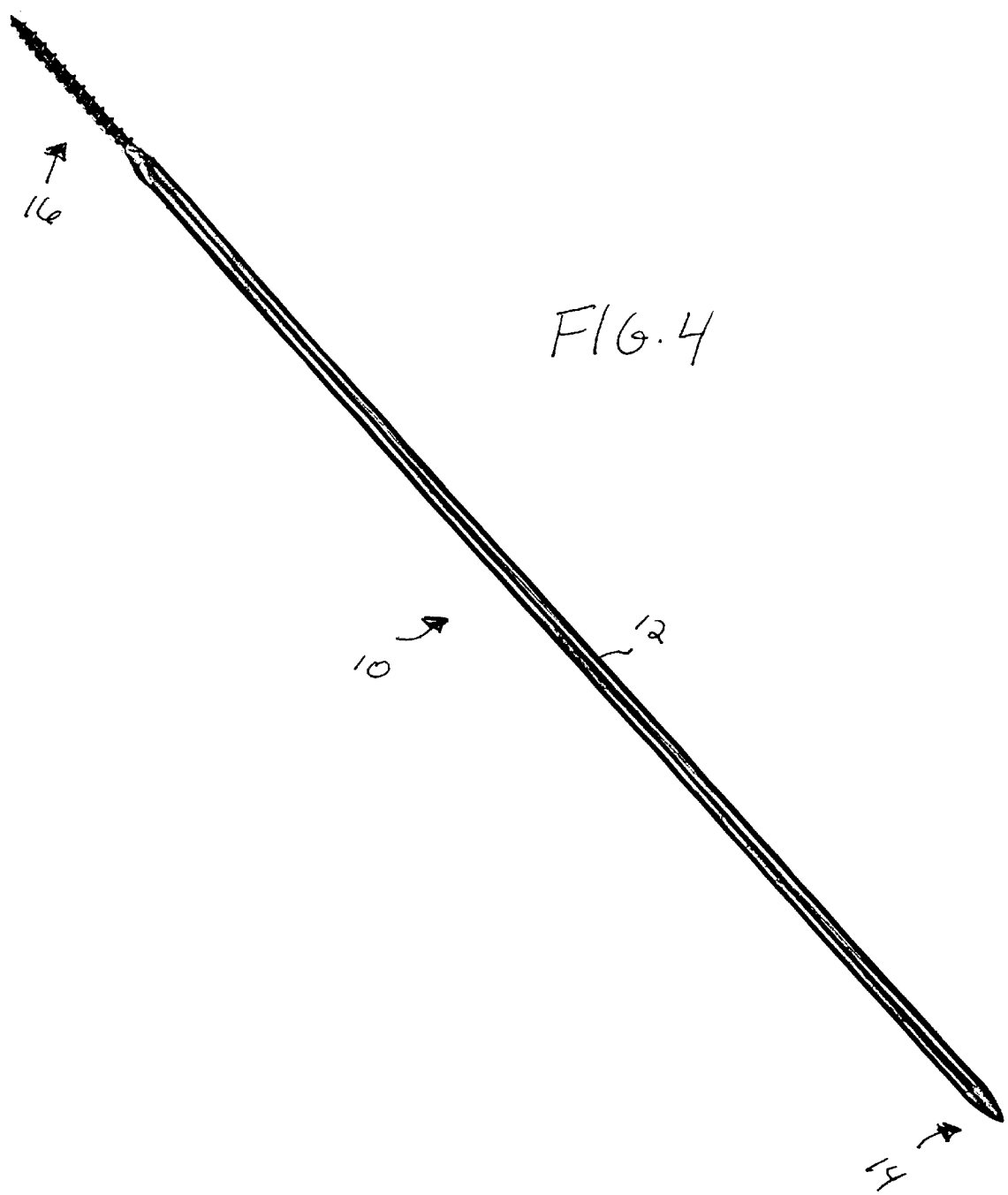
FIG. 4 is a reduced facsimile copy of a preferred embodiment of the wire threading tool.

FIGS. 1 and 4 show a preferred embodiment of the wire threading tool 10 of the present invention. The wire threading tool 10 is preferably a slender rod 12 having a threading end 14 and a wire connecting end 16. As will be described in detail below in connection with FIG. 3, the wire connecting end 16 of the wire threading tool 10 connects to a wire, cable, or other flexible device (indicated generally as 18) that can also be bored so as to be attached to the wire connecting end 16. The wire threading end 14 of the wire threading tool 10 guides the tool through a wall, partition, ceiling, flooring, or other solid surface (indicated generally as 20) that may include insulation 22. By pulling or pushing the wire threading tool 10 through the wall 20, the attached wire 18 follows and is thereby threaded through the wall 20.

The rod 12 is shown as a 3/16" steel rod. However, the rod may be made from any relatively stiff material including, but not limited to, copper, plastic, or ceramic. Further, the width of the rod may be adapted to suit the intended use of the rod. For example, larger widths may be used for heavier cable and narrower widths may be used for lighter cable. It should be noted, however, that a single size can accommodate a great variety of wire sizes. The length of the rod may also be adapted for its intended use. For example, 10"–12" lengths have been shown suitable for use in outside walls or partitions between levels of a building. 24" lengths have been shown as useful for interior walls and floors of manufactured homes.

The threading end 14 of the wire threading tool 10 is shown as tapered or ground to a blunt point. A sharper point may be used for applications in which there is significant or particularly thick insulation present or if a thin membrane (such as those used in manufactured homes) is present. If the rod 12 is made from an alternate material, the threading end 14 may be molded into a pointed form or may be attached as a separate piece.

Figure 2:
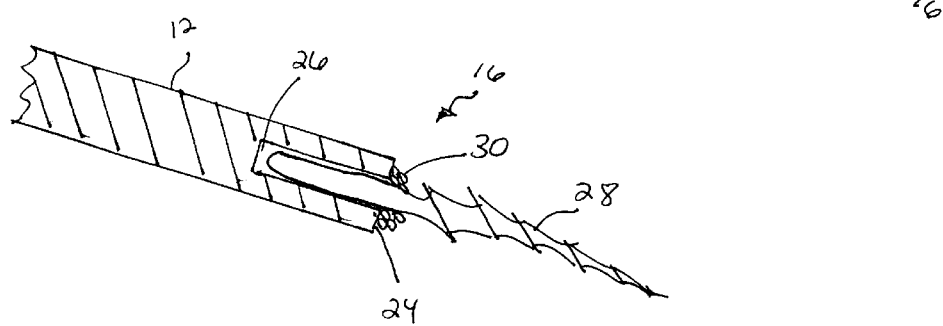
FIG. 2 is an enlarged cross-sectional side view of a preferred embodiment of a wire connecting end of the wire threading tool of the present invention.
Figure 5:
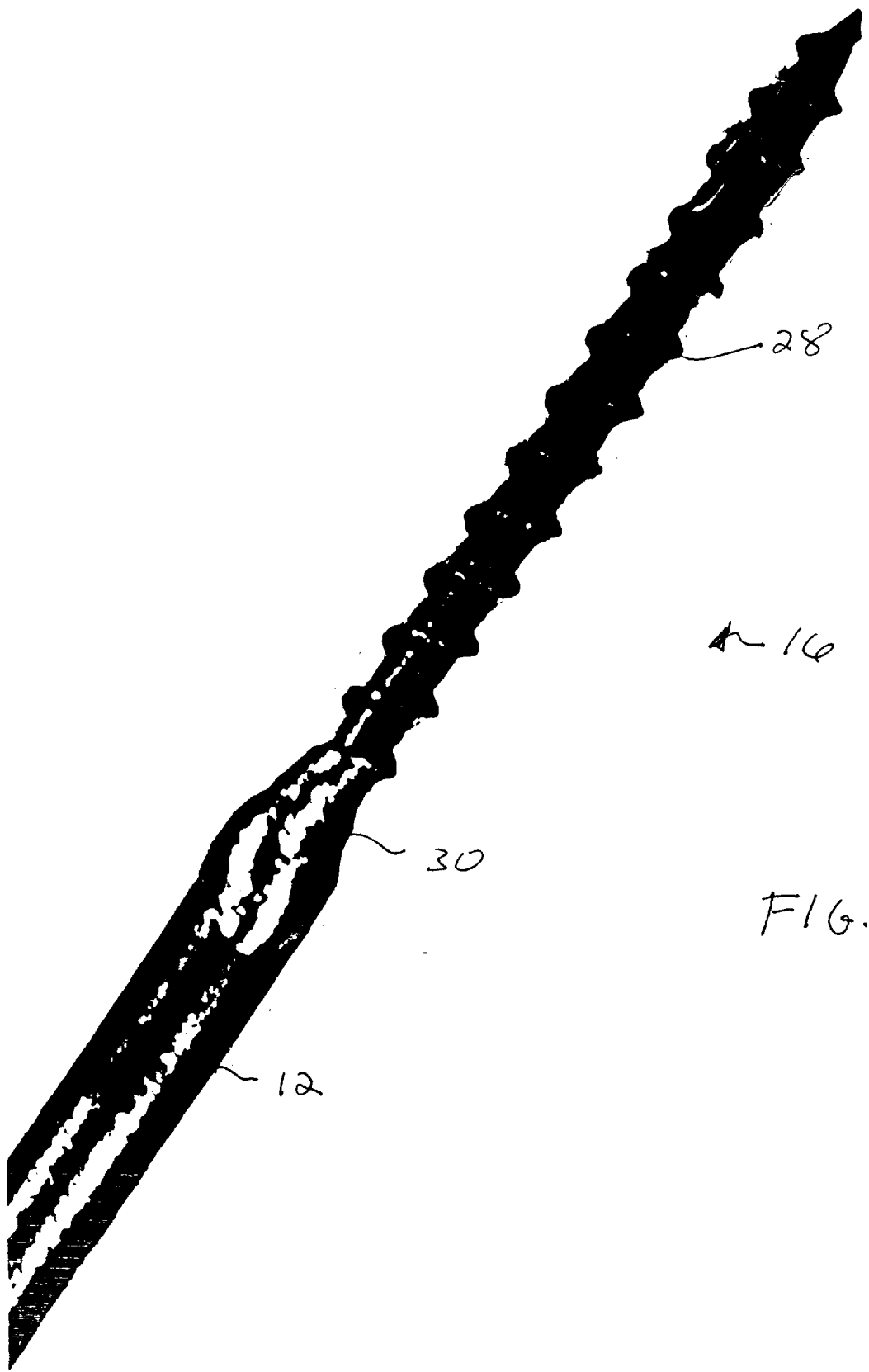
FIG. 5 is an enlarged facsimile copy of the wire connecting end of the wire threading tool of FIG. 4.

The shown embodiment of the wire connecting end 16, shown in detail in FIGS. 2 and 5, preferably has a flat surface 24 on the wire connecting end 16 of the rod 12. The flat end 24 has a bore hole 26 therein. A screw apparatus 28 is inserted into the bore hole 26. The screw apparatus 28 may be a drywall screw with its head removed. Alternatively, the screw apparatus 28 may be any screw-type device suitable for coupling with the end of a wire 18. The screw apparatus 28 is brazed (shown as 30), welded, glued, or otherwise securely interconnected within the bore hole 26. The screw apparatus 28 may also be formed integrally with the rod 12.

FIG. 3 shows the wire connecting tool 10 threading a wire 18 through a wall 20. In this figure the wire connecting end 16 is securely connected to a wire 18. The wire threading end 14 is inserted through a first or inside partition 32, insulation 22, and a second or outside partition 34 of a wall 20. By pulling or pushing the wire threading tool 10 through the wall 20, the attached wire 18 follows and is thereby threaded through the wall 20.

One preferred method for creating the wire threading tool 10 includes the step of cutting a rod 12 to a desired length. One end, the wire threading end 14, of the rod 12 is then tapered or ground to a blunt point. The wire connecting end 16 is then created by grinding or otherwise creating the flat surface 24, drilling or boring the bore hole 26, inserting the screw apparatus 28, and then securing the screw apparatus 28 within the bore hole 26. The screw apparatus 28 may be secured by brazing, welding, gluing, or performing any securing step to securely interconnect the screw apparatus 28 within the bore hole 26. An alternate preferred method for creating the wire threading tool 10 is to mold the tool 10 as a single integral unit.

One preferred method of using the wire threading tool 10 includes connecting the wire connecting end 16 to an untrimmed end of a wire 18, preferably by screwing the screw apparatus 28 into the end of the wire. Next, the threading end 14 is inserted into a preferably pre-bored hole 36 (shown in phantom in FIG. 3) of a first partition 32 of a wall 20, through any insulation 22 present, and through the second partition 34 of the wall 20. The tapered threading end 14 may be used as a guide, may be used to find a hole in the second partition 34, or may be used to puncture a thin membrane (not shown). The tool 10 may either be pulled through the wall 20 by locating the distal end of the tool and pulling it, or may be pushed through by feeding the wire 18 by hand. Once through the wall 20, the attached wire 18 follows the tool 10 and is thereby threaded through the wall 20. The wire 18 may then be trimmed and used for its intended purpose.

The wire threading tool 10, as described above, is useful for threading most types of wires and cables 18 through walls 20, ceilings, and floors of existing buildings. For example, the wire threading tool 10 may be used in the installation or maintenance of telephone wires, cable television cables, and electrical wires. Also, because of the weight of the tool 10, a wire 18 fed through an exterior wall 20 from within the structure will be pulled by gravity downward after the wire connecting end 16 clears the exterior wall 20. By feeding the cable by hand from within the structure, no ladder is necessary for installation on multi-level structures.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for threading a wire through a wall or partition having a near side and an opposite side, comprising the steps of providing a rod having a threaded first end and a tapered second end, engaging said wire with said threaded first end, inserting said tapered second end of said rod through an aperture in the near side of said wall or partition, and pushing said rod through said wall or partition, grasping said rod from said opposite side of said wall or partition and pulling it so as to thread said rod with said engaged wire through said wall or partition.

2. The method of claim 1 wherein said wall or partition comprises a double walled structure having first and second wall members separated by a space, and said method further includes the steps of pushing said rod through said first wall member and through said space, finding an aperture in said second wall member, pushing said tapered second end of said rod through said aperture in said second wall member, and pulling said rod through both of said wall members with said wire attached thereto.

3. The method of claim 2 wherein the step of engaging said wire is accomplished by screwing said threaded first end into an end of said wire along an axis thereof.

4. The method of claim 1 wherein the step of engaging said wire is accomplished by screwing said threaded first end into an end of said wire along an axis thereof.

* * * * *

UNITED STATES PATENT AND TRADEMARK OFFICE
CERTIFICATE OF CORRECTION

PATENT NO. : 6,316,851 B1
DATED : November 13, 2001
INVENTOR(S) : Hiroaki Maegawa et al.

It is certified that error appears in the above-identified patent and that said Letters Patent is hereby corrected as shown below:

Title page,
Item [56], References Cited, U.S. PATENT DOCUMENTS, "4,004,165" should read -- 4,004,168 --.

Column 1,
Line 32, "as" should read -- as can be --;
Line 35, "numerals" should read -- numeral --; and "denote" should read -- denotes --.

Column 2,
Line 45, "the" should read -- a --; and "a" ($1^{st}$ occurrence) should read -- the --.

Column 4,
Line 15, "nevertheless" should read -- although --;
Line 27, "in comparison with the face" should read -- in view of the fact --;
Line 60, "in" should read -- coaxially --;
Line 61, "coaxial" should be deleted.

Column 5,
Line 8, "poles as is" should read -- poles, as --;
Line 21, "excited by supplying electricity" should read -- are excited by supplying electricity to --;
Line 39, "is" should read -- is greater than D1, is --;
Lines 54 and 61, "notches" should read -- gaps --.

Column 6,
Line 9, "the" should read -- since the --;
Line 30, "a" should read -- to a --;
Line 66, "stator" should read -- stators --.

Column 7,
Line 40, "an" should read -- a --.

Column 8,
Line 18, "stator" should read -- stators --;
Line 30, "the few" should read -- a small --;
Line 64, "notches" should read -- gaps --.

Column 9,
Line 60, "increases" should read -- increased --.

UNITED STATES PATENT AND TRADEMARK OFFICE
CERTIFICATE OF CORRECTION

PATENT NO.   : 6,316,851 B1
DATED        : November 13, 2001
INVENTOR(S)  : Hiroaki Maegawa et al.

It is certified that error appears in the above-identified patent and that said Letters Patent is hereby corrected as shown below:

Column 11,
Line 23, "an" should read -- a --.

Column 12,
Line 50, "windened" should read -- widened --.

Column 13,
Line 27, "D2<D2" should read -- D1<D2 --;
Line 40, "magnet" should read -- magnet; --;
Line 41, "and with said rotor magnet side by side;" should be deleted;
Line 46, "notches" should read -- gaps --;
Line 47, "shaft," should read -- shaft, wherein the gaps are between the teeth --.

Column 14,
Line 3, "sand" should read -- said --;
Line 34, "notches" should read -- gaps --;
Line 35, "shaft;" should read -- shaft, wherein the gaps are between the teeth --;
Line 54, "sard" should read -- said --;
Line 56, "comprising:" should read -- according to claim 7, further comprising --;
Lines 57-67, should be deleted.

Column 15,
Lines 1-17, should be deleted.

Column 16,
Lines 1-4, should be deleted.

Signed and Sealed this

Twenty-ninth Day of October, 2002

*Attest:*

JAMES E. ROGAN
*Director of the United States Patent and Trademark Office*

*Attesting Officer*